United States Patent [19]

Satyavathi et al.

[11] Patent Number: 6,037,295

[45] Date of Patent: Mar. 14, 2000

[54] PROCESS FOR THE PREPARATION OF A NEW CATALYST USEFUL FOR PRODUCING ALKYLATED AROMATIC AMINES

[75] Inventors: Bankupalli Satyavathi; Akash Narhar Rao Patwari; Uday Triambakraj Bhalerao, all of Hyderabad, India

[73] Assignee: Council of Scientific & Industrial Research, New Delhi, India

[21] Appl. No.: 09/168,241

[22] Filed: Oct. 8, 1998

Related U.S. Application Data

[63] Continuation of application No. 09/047,718, Mar. 25, 1998, abandoned.

[51] Int. Cl.[7] .............................. B01J 21/16; B01J 23/00; B01J 23/70
[52] U.S. Cl. ........................... 502/84; 502/302; 502/308; 502/309; 502/310; 502/318; 502/345; 502/350; 502/352
[58] Field of Search .................................. 502/84, 305–355

[56] References Cited

U.S. PATENT DOCUMENTS

| | | | |
|---|---|---|---|
| 3,717,670 | 2/1973 | Schultz | 502/150 |
| 5,023,221 | 6/1991 | Occelli | 502/66 |
| 5,232,886 | 8/1993 | Yoshimoto et al. | 502/185 |
| 5,710,091 | 1/1998 | Khare | 502/342 |

*Primary Examiner*—Mark L. Bell
*Assistant Examiner*—Patricia L. Hailey
*Attorney, Agent, or Firm*—Ladas & Parry

[57] ABSTRACT

The subject invention relates to a catalyst comprises 1–75% of iron oxide, 1–10% of titanium metal oxide and the balance being attapulgate useful for the preparation of alkylated aromatic amines.

8 Claims, No Drawings

PROCESS FOR THE PREPARATION OF A NEW CATALYST USEFUL FOR PRODUCING ALKYLATED AROMATIC AMINES

This application is a continuation of application Ser. No. 09/047,718, filed Mar. 25, 1998, now abandoned.

The present invention relates to a catalyst and a process for the preparation of the catalyst useful for the preparation of alkylated aromatic amines. This invention particularly relates to a process for preparation of attapulgite impregnated with a combination of iron oxide and oxides selected from transition metals of the Periodic Table.

Attapulgite used in the catalyst is fibrous clay. The chemical analysis of attapulgite clay shows the presence of oxides such as $SiO_2$, $Al_2O_3$, $MgO$, $Na_2O$, $Fe_2O_3$ and water along with traces of nickel, chromium, zinc, copper, lead, tin, vanadium and silver and the composition of Attalpulgite in form of mole percent is as follows:

| | |
|---|---|
| $SiO_2$ | 55.03% |
| $Al_2O_3$ | 10.24% |
| $Fe_2O_3$ | 03.53% |
| $MgO$ | 10.49% |
| $K_2O$ | 00.47% |
| $H_2O^-$ | 09.73% |
| $H_2O^+$ | 10.13% |

BACKGROUND OF THE INVENTION

Attapulgite is used as a polymerization catalyst, in refining vegetable oils and fats, as a carrier for granular and powdered agricultural chemicals (insecticides and herbicides), in petroleum refining, decolorizing, neutralizing, brightening and for desulphurisation. It is also used as an oil base and water base foundry sand binders, latex paint thickener, gelling agent, polishing-suspending agent for abrasives and as a wax emulsion stabilizer.

BRIEF DESCRIPTION OF THE INVENTION

We have carried out extensive research in respect of the use of attapulgite for catalyzing chemical reactions. We have observed during our research that attapulgite can be used as catalyst for alkylation reaction. During our continued work developing attapulgite as a catalyst for selective alkylation of aromatic amines we have observed that when attapulgite is impregnated with a combination of iron oxide and oxides selected from transition metals of the Periodic Table, the effect of alkylation is greatly enhanced. The catalyzing activity of the resultant catalyst for the alkylation reaction, in particular for ortho and N-alkylation is found to be enhanced.

Alkylated aromatic amines are useful in a broad range of applications. Particularly ortho-alkylated aromatic amines are used as intermediates for producing dyes, resin stabilizers, rubber compounding ingredients and the like.

N-Alkylated aromatic amines are useful in a broad range of applications. They are used as raw materials for synthesis of organic chemicals, and as intermediates for producing dyes, in agrochemical industries like fertilizers, as resin stabilizers, rubber compounding ingredients and the like. Several combinations of the catalyst have been reported, in particular alumina promoted with different metal oxides appears to have been widely employed. Zeolites have been used extensively as catalysts for the production of N-alkylated anilines. Bauxite is also proved to be a good catalyst for this reaction.

In our copending U.S. application Ser. No. 09/047,719 (Corresponding to Indian Patent Application Number 2619/DEL/96) we have described a process for the preparation of alkylated aromatic amines which comprises reacting an aromatic amine selected from aniline, toludine, xylidine, N-methyl aniline, N-ethyl aniline, m-ethyl aniline, p-ethyl aniline, o-ethyl aniline with a primary or secondary alcohol selected from ethanol, methanol, isopropyl alcohol in the presence of attalpulgite impregnated with a combination of iron oxide and oxides selected from transition metals of the Periodic Table as a catalyst prepared at a temperature in the range of 300–400° C. and recovering the desired amine by conventional methods. Here, we have described a process for the preparation of alkylated aromatic amines employing the catalyst prepared by the process of the present invention.

The main object of the present invention is to provide a catalyst and a process for the preparation of the catalyst consisting of attapulgite impregnated with iron oxide and oxides selected from transition metals of the Periodic Table.

This invention is based on the findings that when attapulgite is impregnated with a combination of iron oxide and oxides selected from transition metals of the Periodic Table the activity of the resultant catalyst is enhanced for selective alkylation of the aromatic amines.

DETAILED DESCRIPTION OF THE INVENTION

Accordingly, the present invention provides a catalyst comprising 1–75% of iron oxide, 1–10% of oxides selected from transition metals of the Periodic Table and the balance being attapulgite usefull for the preparation of alkylated aromatic amines and a process for the preparation of the said catalyst useful for the preparation of alkylated aromatic amines.

In another embodiment of the present invention, it provides a process for the preparation of the catalyst which comprises impregnating attapulgite with a combination of iron oxide and oxides selected from transition metals of the Periodic Table, converting the resultant catalyst to the desired form, drying the catalyst and calcining by known methods.

The oxides of the transition metals used for impregnation may be selected from copper oxide, titanium oxide, zirconium oxide, chromium oxide and the like. The amount of iron oxide used ranges from 1–75% and the amount of transition metal oxide used may range from 1–10%.

The resulting catalyst may be dried at a temperature in the range of 90 to 100° C. The catalys may be calcined at a temperature in the range of 400 to 450° C.

The invention is described in detail in the examples which are provided by way of illustration only and should not be construed to limit the scope of the invention.

EXAMPLES

Example 1

76 gms of ferric nitrate 9 hydrates is dissolved in 200 ml of distilled water. Attapulgite, 170 gms is taken to which vacuum is applied. Ferric nitrate solution is added to attapulgite with constant stirring. Excess water in the mixture is evaporated. When the mixture is slightly wet 2.0 gms of germanium dioxide is added with constant mixing. The resultant catalyst is then extruded and pelletized. The pellets are dried at a temperature of 90–100° C. for a period of 24 hours and then calcined at 450° C. for a period of 5 hours.

Example 2

305 gms of ferric nitrate 9 hydrates is dissolved in 200 ml of distilled water. Attapulgite, 80 gms is taken to which vacuum is applied. Ferric nitrate solution is added to attapulgite with constant stirring. Excess water in the mixture is evaporated. When the mixture is slightly wet 4 gms of tin oxide is added with constant mixing. The resultant catalyst is then extruded and pelletized. The pellets are dried at a temperature of 90–100° C. for a period of 24 hours and then calcined at 450° C. for a period of 5 hours.

Example 3

128 gms of ferric nitrate 9 hydrates is dissolved in 200 ml of distilled water. Attapulgite, 150 gms is taken to which vacuum is applied. Ferric nitrate solution is added to attapulgite with constant stirring. Excess water in the mixture is evaporated. When the mixture is slightly wet 5 gms of zinc oxide is added with constant mixing. The resultant catalyst is then extruded and pelletized. the pellets are dried at a temperature of 90–100° C. for a period of 24 hours and then calcined at 450° C. for a period of 5 hours.

We claim:

1. A catalyst comprising 1–75% of iron oxide, 1–10% of a transition metal oxide selected from the group consisting of copper oxide, titanium oxide, zirconium oxide and chromium oxide; and the balance being attapulgite.

2. A process for the preparation of a catalyst according to claim 1 which comprises the steps of impregnating attapulgite with a combination of iron oxide and an oxide selected from the group consisting of copper oxide, titanium oxide, zirconium oxide, and chromium oxide, forming the catalyst, drying the catalyst and calcining.

3. A process according to claim 2 wherein the catalyst is dried at a temperature in the range of 90° to 100° C.

4. A process according to claim 2 wherein the catalyst is calcined at a temperature in the range of 400°–450° C.

5. A catalyst comprising 1–75% of iron oxide, 1–10% of an oxide selected from the group consisting of geranium dioxide, tin oxide and zinc oxide; and the balance being attapulgite.

6. A process for the preparation of the catalyst according to claim 5 which comprises the steps of impregnating attapulgite with an oxide selected from the group consisting of zinc oxide, geranium dioxide and tin oxide, forming the catalyst, drying the catalyst and calcining.

7. A process according to claim 6 wherein the catalyst is dried at a temperature in the range of 90° to 100° C.

8. A process according to claim 6 wherein the catalyst is calcined at a temperature in the range of 400°–450° C.

* * * * *